(12) United States Patent
Hussain et al.

(10) Patent No.: US 10,801,363 B2
(45) Date of Patent: Oct. 13, 2020

(54) GAS TURBINE ENGINE

(71) Applicant: ROLLS-ROYCE plc, London (GB)

(72) Inventors: Zahid M. Hussain, Derby (GB); Oliver Taylor-Tibbott, Lichfield (GB)

(73) Assignee: ROLLS-ROYCE plc, London (GB)

( * ) Notice: Subject to any disclaimer, the term of this patent is extended or adjusted under 35 U.S.C. 154(b) by 242 days.

(21) Appl. No.: 15/935,795

(22) Filed: Mar. 26, 2018

(65) Prior Publication Data
US 2018/0274386 A1 Sep. 27, 2018

(30) Foreign Application Priority Data

Mar. 27, 2017 (GB) .................................. 1704841.4

(51) Int. Cl.
| | |
|---|---|
| *B64D 13/04* | (2006.01) |
| *F01D 21/14* | (2006.01) |
| *F01D 17/10* | (2006.01) |
| *F02C 7/00* | (2006.01) |
| *F02C 3/04* | (2006.01) |

(52) U.S. Cl.
CPC ........... *F01D 21/14* (2013.01); *F01D 17/105* (2013.01); *F02C 7/00* (2013.01); *B64D 13/04* (2013.01); *F02C 3/04* (2013.01); *F05D 2220/32* (2013.01); *F05D 2240/14* (2013.01); *F05D 2260/30* (2013.01); *F05D 2260/606* (2013.01); *Y02T 50/672* (2013.01)

(58) Field of Classification Search
CPC ..... F05D 2240/14; F01D 25/12; B64D 13/04; B64D 2033/0246; B64D 29/08
See application file for complete search history.

(56) References Cited

U.S. PATENT DOCUMENTS

| | | | | |
|---|---|---|---|---|
| 4,825,644 | A * | 5/1989 | Bubello | B64D 29/00 60/200.1 |
| 6,059,531 | A * | 5/2000 | Tai | F04D 29/34 416/220 A |
| 2003/0150214 | A1* | 8/2003 | Lair | F02C 9/18 60/771 |
| 2009/0179110 | A1* | 7/2009 | Leyens | B64C 1/18 244/129.4 |
| 2009/0308978 | A1* | 12/2009 | Kelnhofer | B64C 1/18 244/129.5 |
| 2011/0142608 | A1* | 6/2011 | Derenes | B64D 29/08 415/201 |
| 2011/0171014 | A1 | 7/2011 | Lore et al. | |
| 2011/0240137 | A1* | 10/2011 | Vauchel | B64D 29/00 137/15.2 |
| 2012/0085426 | A1* | 4/2012 | Kent | F16K 15/023 137/15.01 |

(Continued)

FOREIGN PATENT DOCUMENTS

CN 203094456 7/2013

OTHER PUBLICATIONS

Great Britain Search Report dated Sep. 27, 2017, issued in GB Patent Application No. 1704841.4.

*Primary Examiner* — Gerald L Sung
(74) *Attorney, Agent, or Firm* — Oliff PLC

(57) ABSTRACT

A pressure relief arrangement for a gas turbine engine comprises a hinged door and a mount spaced from the door. An expandable structure is connected to the door and to the mount such that when the door hinges open the expandable structure expands.

20 Claims, 2 Drawing Sheets

(56) References Cited

U.S. PATENT DOCUMENTS

| | | | | |
|---|---|---|---|---|
| 2014/0158833 A1* | 6/2014 | Braeutigam | ........... | B64D 33/02 |
| | | | | 244/53 B |
| 2015/0266585 A1* | 9/2015 | Krittian | .................... | F16K 1/00 |
| | | | | 454/73 |
| 2016/0145918 A1* | 5/2016 | Liang | .................... | B64C 1/1446 |
| | | | | 292/99 |
| 2017/0009599 A1* | 1/2017 | Dahmen | ................... | F02C 7/00 |
| 2018/0010797 A1* | 1/2018 | Marusko | ................ | F23R 3/002 |
| 2019/0112986 A1* | 4/2019 | Ruston | ................... | B64D 29/00 |

* cited by examiner

GAS TURBINE ENGINE

CROSS-REFERENCE TO RELATED APPLICATIONS

This specification is based upon and claims the benefit of priority from UK Patent Application Number 1704841.4 filed on 27 Mar. 2017, the entire contents of which are incorporated herein by reference.

BACKGROUND

1. Field of the Disclosure

The present disclosure concerns a pressure relief arrangement and/or a gas turbine engine.

2. Description of the Related Art

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core. Airflow from the fan is split with most of the air being directed through a bypass duct and the remainder of the air being directed to the engine core. A casing is provided around the engine core, and various components that protrude into the bypass duct connect to the engine core. In some gas turbine engine designs, an A-frame is provided between the engine core and an outer by-pass casing for the transmission of torsional loads.

One or more emergency pressure relief doors may be provided for preventing over pressure, i.e. pressure above a predetermined level, in core components in an event such as a burst pipe or duct. Conventionally, a pressure relief door is hinged to an adjacent structure, for example the casing. The hinge is arranged to define the arc within which the door opens. A cable may be provided which connects the door to a mounting spaced from the door. The cable sets the limit of maximum opening of the door. A piston and cylinder arrangement is also connected between the door and the mount for dissipating energy in the event of the door opening. Conventionally, the cylinder includes a medium, such as a honeycomb, which the piston crushes when the door is opened to dissipate energy. The extent the door opens needs to be restricted and energy needs to be dissipated during opening to avoid or reduce impacts with components of the gas turbine engine, so as to avoid the door damaging engine components.

The cable, piston and cylinder arrangement is fairly complex and it can be susceptible to mechanism failures over time.

The present disclosure seeks to provide an arrangement for controlling a burst duct door that is less complex than conventional arrangements.

SUMMARY

According to a first aspect there is provided a pressure relief arrangement for a gas turbine engine. The arrangement comprises a hinged door and a mount spaced from the door. An expandable structure is connected to the door and to the mount such that when the door hinges open the expandable structure expands.

The expandable structure may comprise an expander. The expander may be configured to move between a first configuration and a second configuration, the second configuration having a greater volume than the first configuration.

The expander, when in the first configuration, may be in a substantially two-dimensional (2D) configuration, i.e. a substantially planar configuration. The expander, when in the second configuration, may be in a three-dimensional (3D) configuration, i.e. a volumetric configuration.

The expander may be in the substantially 2D configuration when the door is closed. The expander may be in the 3D configuration when the door is open.

The expander may comprise slots, holes and/or folds configured such that the expander can move between the first configuration and the second configuration.

The expander may be made from a metallic or a metallic composite material.

The expander may comprise a pop-up structure adapted to expand from the first configuration to the second configuration.

The expander may undergo a plastic deformation when passing from the first configuration to the second configuration. In other words, when over pressure is released, the expander may not return from the second configuration to the first configuration spontaneously. Once in the second configuration, the expander may hold the door open and may retain the second configuration.

The arrangement may comprise a cable that connects to the mount and to the expander.

The expander may connect to the cable at a single connection point.

The expander may connect directly to the door.

The expander may connect to the door at a plurality of points, or along a perimeter of an area defined by the expander.

At a location of connection to the door, the area of the expander may be greater than 40% of the area of a surface of the door to which the expander is connected, for example greater than 50% or greater than 60%.

The arrangement may comprise a latch configured to align one end of the door with an adjacent component. The latch may be configured to open when a pressure above a predetermined level is applied to the door.

In an aspect there is provided a gas turbine engine comprising the arrangement according to the previous aspect.

The gas turbine engine may comprise an engine core, and a casing member surrounding the engine core. The mount may be provided radially internally of the casing member and the door may be arranged to pivot outwardly away from the core (e.g. towards a bypass duct of the engine).

In an aspect there is provided a pressure relief arrangement for a gas turbine engine, the arrangement comprising a hinged door; a mount spaced from the door; and an expandable structure comprising a pop-up structure connected to the door and to the mount, wherein when the door is closed the pop-up structure is in a planar configuration and when the door is open the pop-up structure is in a volumetric configuration.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
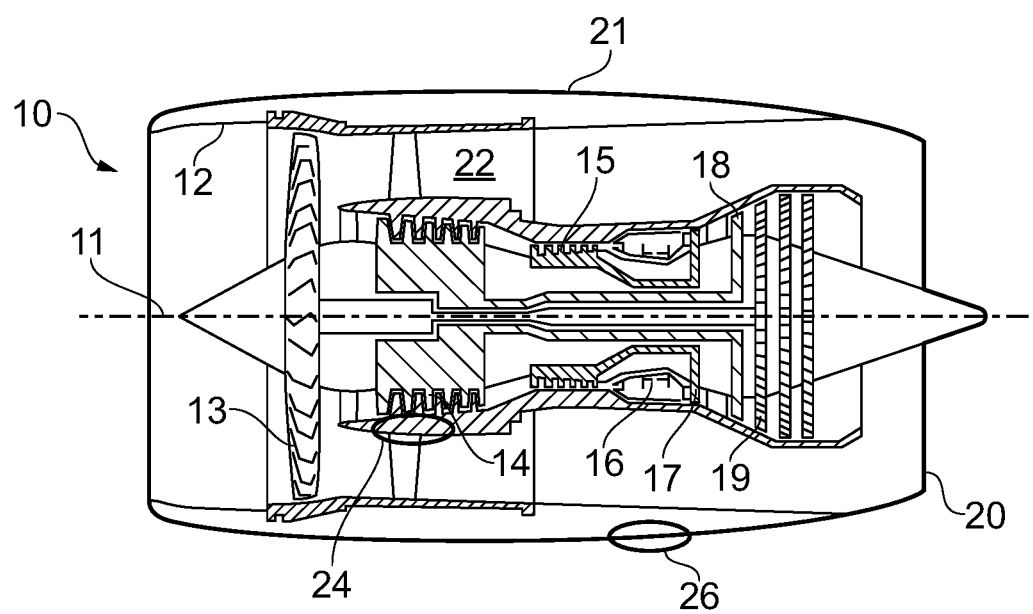
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

A pressure relief arrangement may be provided at location between the core and the bypass duct, the location of the pressure relief arrangement is indicated generally at 24 in FIG. 1. In some embodiments, a pressure relief arrangement may be provided in a location indicated generally at 26. Often pressure relief arrangements are provided on the edge of ventilation zones to provide pressure relief in the event of a pipe or duct failure.

Figure 2:
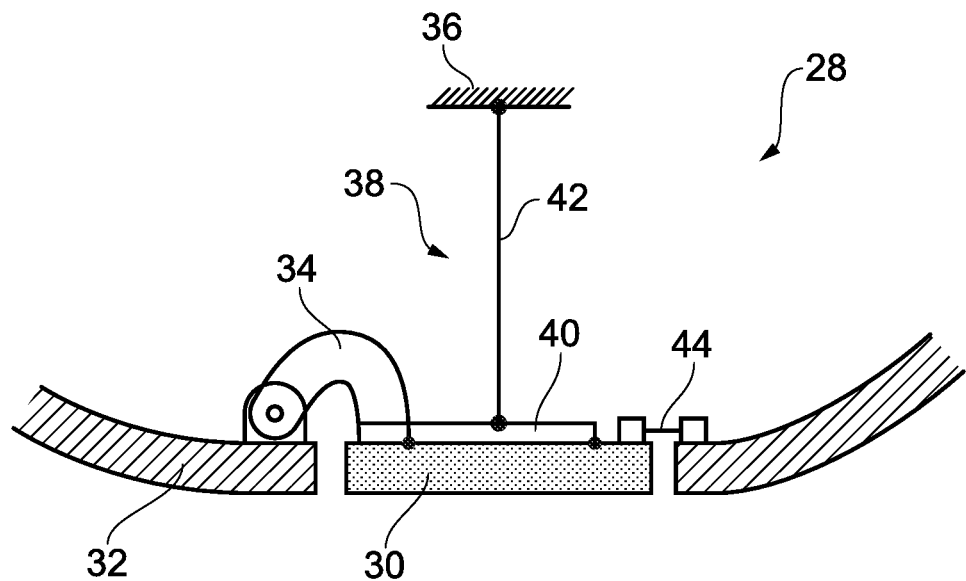
FIG. 2 is a sectional view of a pressure relief arrangement in a closed position.
Figure 3:
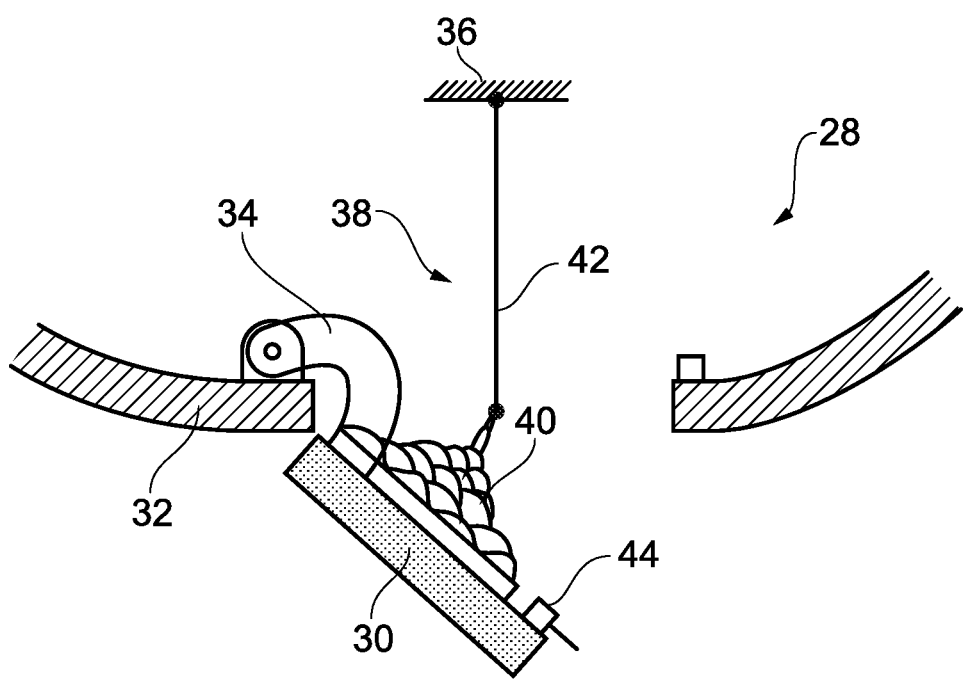
FIG. 3 is a sectional view of the pressure relief arrangement of FIG. 2 in an open position.

Referring to FIGS. 2 and 3, a pressure relief arrangement is indicated generally at 28. The pressure relief arrangement includes a door 30 that is pivotably connected to a casing member 32 by a hinge 34. The hinge 34 is connected at one end of the door 34. The door 30 is also connected to a mount 36 via an expandable structure 38. In the present example, the mount 36 is a core mount. The mount 36 is provided on a side of the door opposite to the direction in which the door pivots if opened.

The expandable structure 38 includes an expander 40 and a cable 42. The cable 42 is non-expandable and connects directly between the mount and the expander 40. In the present example, the expander 40 connects at a single point to the cable 42 and at multiple points or along a perimeter to the door 30. In the present example, the expander is connected over an area of the door that is approximately greater than 40% of the area of a surface of the door to which the expander is connected, for example greater than 50%, or greater than 60%.

The expander 40 in the present example is made from a metallic material. However, in alternative embodiments the expander may be made from a metallic composite material. Depending on where the expander is to be used, the type of metal will be selected accordingly. However, in many cases, the metallic material will be selected so as to be capable of operation over a range of −30° C. to over +300° C. The expander is formed using holes, slots and/or folds so that it can move between a compact state (illustrated in FIG. 2) and an expanded state (illustrated in FIG. 3). The expander may be a meshed structure. Alternatively, the expander may use geometric shapes and folds to enable it to move between the compact state and the expanded state. In exemplary embodiments, the expander may be designed using principles of metal origami, or pop-up structures.

The door 30 is latched to the casing 32 by a latch 44 provided at an opposite end of the door to the hinge 34. In the present example, the latch 44 is configured such that when the pressure differential across the door reaches a certain level, the latch fails so the door can open. However, in alternative examples, a pressure sensor and control assembly may be provided to unlatch the door when a given pressure is detected.

Referring to FIG. 2, during normal operation of the gas turbine engine, the door 30 is aligned with the casing 32 and seals the gap provided therein (i.e. where the door is provided). The latch 44 is closed. The expander 40 is in a compact position, or, in other words, in a substantially 2D, or planar, configuration. The cable 42 is extended, but in the present example is not under tension.

Referring to FIG. 3, when the pressure on the radially inner side of the door (i.e. the side proximal to the mount 36) exceeds a certain level the latch 44 fails. The door 30 pivots about the hinged joint 34 to open. As the door opens, the expander 40 moves from the compact state (shown in FIG. 2) to the expanded state (shown in FIG. 3), or, in other words, in a 3D, or volumetric, configuration. The cable 42 is subject to tension, but does not substantially extend.

As the door 30 hinges open, the expander 40 may undergo a plastic deformation, such as to maintain the expanded state. In other words, once deployed, the expander 40 will hold the door open and retain the expanded state.

The arrangement described above can have one or more of the following advantages compared to arrangements of the prior art:

Reduction in part count because there is no need to have an articulated mechanism, such as a piston and cylinder arrangement Simplified manufacture Reduced possible failures in service Weight reduction Lower capital cost Increased control of door opening It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A pressure relief arrangement for a gas turbine engine, the pressure relief arrangement comprising:
   a hinged door;
   a mount spaced from the hinged door; and
   an expandable structure connected to the hinged door and to the mount such that when the hinged door hinges open the expandable structure expands, wherein
   the expandable structure comprises an expander configured such that the expander can move between a first configuration and a second configuration, the second configuration having a greater volume than the first configuration, and
   the expander is configured to undergo plastic deformation to transform into and remain in the second configuration.

2. The pressure relief arrangement according to claim 1, wherein the expander comprises slots, holes and/or folds configured such that the expander can move between the first configuration and the second configuration.

3. The pressure relief arrangement according to claim 1, wherein the expander comprises a pop-up structure configured to expand from the first configuration to the second configuration.

4. The pressure relief arrangement according to claim 1, comprising a cable that connects to the mount and to the expander.

5. The pressure relief arrangement according to claim 4, wherein the expander connects to the cable at a single connection point.

6. The pressure relief arrangement according to claim 1, wherein the expander connects directly to the hinged door.

7. The pressure relief arrangement according to claim 1, wherein the expander connects to the hinged door at a plurality of points, or along a perimeter of an area defined by the expander.

8. The pressure relief arrangement according to claim 7, wherein at the location of connection to the hinged door, the area of the expander is greater than 40% of the area of a surface of the hinged door to which the expander is connected.

9. The pressure relief arrangement according to of claim 1, wherein the expander, once in the second configuration, holds the hinged door open.

10. The pressure relief arrangement according to claim 1, wherein the expander is made from a metallic or a metallic composite material.

11. The pressure relief arrangement according to claim 1, comprising a latch configured to align one end of the hinged door with an adjacent component, wherein the latch is configured to open when a pressure above a predetermined level is applied to the hinged door.

12. A gas turbine engine comprising a pressure relief arrangement, the pressure relief arrangement comprising:
    a hinged door;
    a mount spaced from the hinged door; and
    an expandable structure connected to the hinged door and to the mount such that when the hinged door hinges open the expandable structure expands, wherein
    the expandable structure comprises an expander configured such that the expander can move between a first configuration and a second configuration, the second configuration having a greater volume than the first configuration, and
    the expander is configured to undergo plastic deformation to transform into and remain in the second configuration.

13. The gas turbine engine according to claim 12, comprising an engine core, and a casing member surrounding the engine core, and wherein the mount is provided radially internally of the casing member and the hinged door is arranged to pivot outwardly away from the core.

14. A pressure relief arrangement for a gas turbine engine, the pressure relief arrangement comprising:
    a hinged door;
    a mount spaced from the hinged door; and
    an expandable structure connected to the hinged door and to the mount such that when the hinged door hinges open the expandable structure expands, wherein
    the expandable structure comprises an expander with a mesh configured such that the expander can move between a first configuration and a second configuration, the second configuration having a greater volume than the first configuration.

15. The pressure relief arrangement according to claim 14, comprising a cable that connects to the mount and to the expander.

16. The pressure relief arrangement according to claim 15, wherein the expander connects to the cable at a single connection point.

17. The pressure relief arrangement according to claim 14, wherein the expander connects directly to the hinged door.

18. The pressure relief arrangement according to claim 14, wherein the expander connects to the hinged door at a plurality of points, or along a perimeter of an area defined by the expander.

19. The pressure relief arrangement according to claim 18, wherein at the location of connection to the hinged door, the area of the expander is greater than 40% of the area of a surface of the hinged door to which the expander is connected.

20. The pressure relief arrangement according to of claim 14, wherein the expander, once in the second configuration, holds the hinged door open and retains the second configuration.

* * * * *